United States Patent
Ducate, Sr.

(10) Patent No.: US 7,021,201 B1
(45) Date of Patent: Apr. 4, 2006

(54) RADIANT BAFFLE FOR GAS FIRED COOKER

(76) Inventor: John Ducate, Sr., 1104 Enclave Way, Columbia, SC (US) 29223

( * ) Notice: Subject to any disclaimer, the term of this patent is extended or adjusted under 35 U.S.C. 154(b) by 0 days.

(21) Appl. No.: 10/241,868

(22) Filed: Sep. 12, 2002

(51) Int. Cl.
*A47J 37/00* (2006.01)
(52) U.S. Cl. .......................... 99/401; 99/447
(58) Field of Classification Search ................ 99/401, 99/447; 126/41 R
See application file for complete search history.

(56) References Cited

U.S. PATENT DOCUMENTS 4,089,258 A * 5/1978 Berger .................. 99/339
5,129,312 A * 7/1992 Berger .................. 99/340
5,195,425 A * 3/1993 Koziol .................. 99/421 H
5,755,154 A * 5/1998 Schroeter et al. .......... 99/401

* cited by examiner

*Primary Examiner*—Reginald L. Alexander
(74) *Attorney, Agent, or Firm*—Nexsen Pruet Adams Kleemeier, LLC; Michael A. Mann

(57) ABSTRACT

A gas-fired grill that includes a full length side burner and baffle for channeling heat towards food on a rotisserie spit. The burner and baffle are the same width as the grill. The baffle is made of a reflector shield stamped from sheet stock, corrugated for strength, and made of a material having good reflective properties. The baffle has edges that fit into lances carried by the grill housing for convenient removal and cleaning of the baffle. The position of the burner within the baffle and the shape of the baffle itself increase the hot air circulating around the food during cooking and concentrate radiant energy directed towards the food.

6 Claims, 5 Drawing Sheets

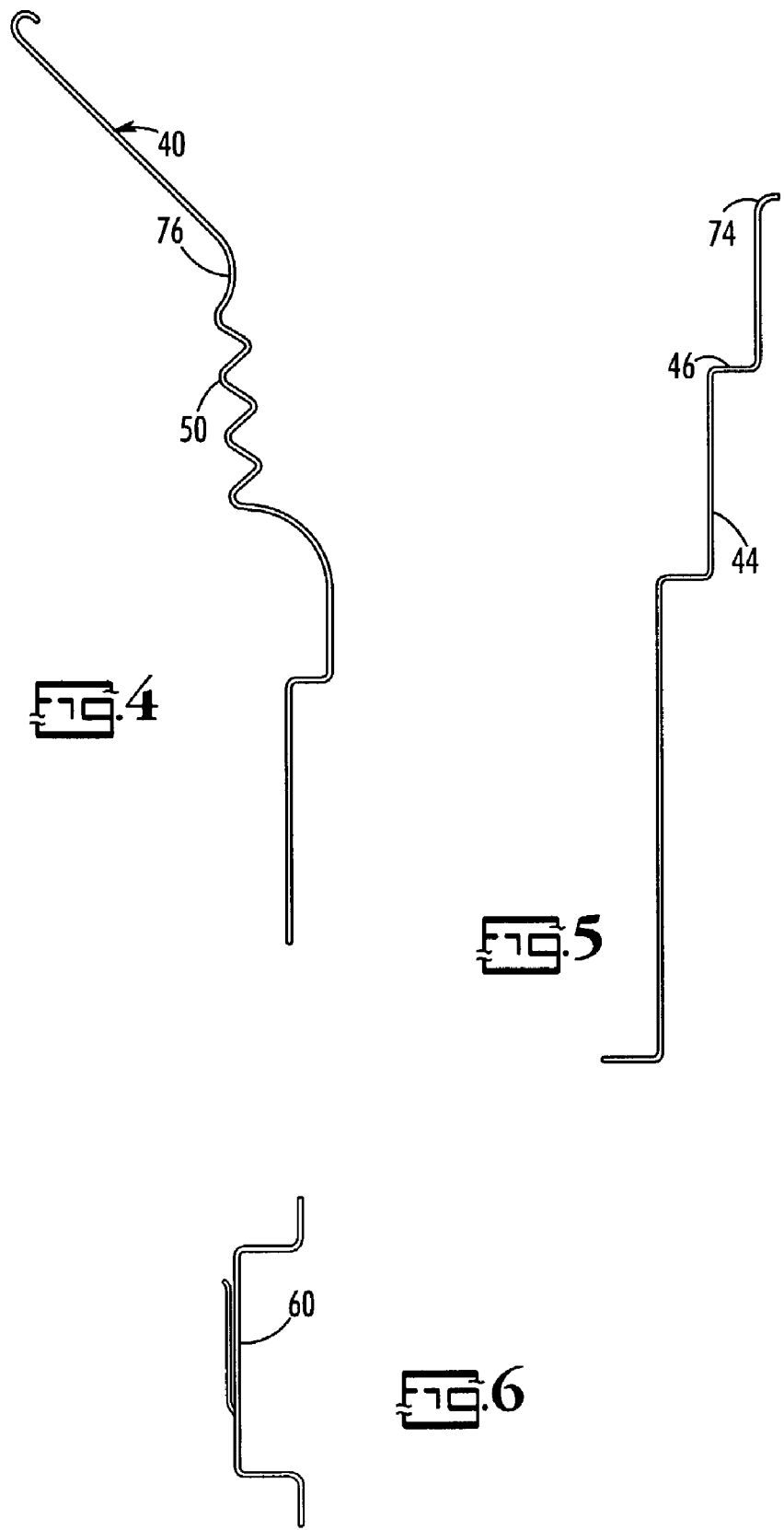

RADIANT BAFFLE FOR GAS FIRED COOKER

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A SEQUENCE LISTING, A TABLE, OR A COMPUTER PROGRAM LISTING COMPACT DISK APPENDIX

Not Applicable.

FIELD OF THE INVENTION

The present invention relates generally to gas fired cookers, such as outdoor grills, with rotisserie systems. Specifically the present invention relates to gas fired outdoor grills with horizontal heating zones cooperating with radiant baffles to improve rotisserie-style spit cooking.

BACKGROUND OF THE INVENTION

While outdoor cooking is an ancient pursuit, modern conveniences have confined the need to cook out of doors to a pastime for entertainment. Following this trend, the standard pot-type charcoal-fired grill from the 1950s has been largely replaced with gas-fired grills sporting various accoutrements. Especially in the past several decades, many improvements have been made to gas-fired grills in order to better enable the user to grill food. Such improvements have included side burners to cook food in pots, and rotating spits, i.e. rotisseries, for improved, even roasting of food. The addition of rotisseries for use with gas grills has led to the further refinement of the grills themselves, including modifications to burners and different burner configurations, to yield better cooking results.

In cooking, there are two major heat transfer systems that work to heat the food: convection and radiation. While present, conductive heat transfer is a minor primary heat transfer mode, especially in a rotisserie where the food is cooked without direct contact to a cooking surface. Previous grill designs with rotisseries simply used the burners positioned underneath the cooking surface to cook the food using convection. In this convection arrangement, the hot air heated by the burners rises vertically to meet the food to be cooked. While some of the heat transferred to the food was also in the radiant form, convection was the main principle at work for such vertical heat rotisserie systems. The vertical heat systems had a number of potential drawbacks including the tendency for flare up when grease drippings produced by the cooking food fell to the hot burners below. In addition to being potentially dangerous to the user, the fires would also cause the food to burn, thus making a rotisserie less attractive.

Recently, burners positioned next to the rotating food and heating it horizontally, as opposed to underneath it, have been developed for outdoor gas grill rotisseries in order to improve cooking by using more radiant heat energy transfer. Although the horizontal heat rotisserie system resolved the problem of flaming grease drippings, improvements are still needed to make these systems more effective for consumers, as well as more economical to manufacture.

Along with horizontal burners, inventors have also developed baffles to help project and evenly disperse radiant heat energy created by the horizontal burners. The combination of a horizontal burner and properly designed baffle will combine to increase cooking efficiency and quality. A baffle also protects the user from potential direct contact with the flames. For example, U.S. Pat. No. 5,129,312, issued to Berger, discloses one such horizontal cooking burner operating in concert with a radiant baffle for outdoor gas grills with rotisseries.

Although gas grill designs continue to improve, a number of disadvantages still need to be addressed. As the demand for cooking on the grill increases, the variety of foods prepared by rotisserie grilling has expanded beyond just roasts and chickens. Depending on the size and shape of the food, conventional gas grills with rotisseries may not include the adequate dimensions and features to prepare such food. Growing concern to ensure that food is fully cooked in order to eliminate any disease-causing organisms in the food is also affecting the way people cook on back yard grills.

Consequently, various types of food require more thorough and complete cooking on specially dimensioned grills. While the rotisserie spit of most gas grills is typically as long as the grill's cooking surface, usually as a result of the necessity for supporting the spit on both sides of the grill housing, the conventional wisdom of manufacturing economy dictates that the horizontal burner be significantly shorter than the grill cooking surface. The arrangement is disadvantageous in the case that larger foods, such as turkeys, are being prepared. Therefore, the use of longer horizontal burners would assist the user to cook this type of food more thoroughly and effectively.

Another disadvantage faced by gas grills is the time and effort involved in their cleaning. Through the use of improved grill designs, people are more apt to entertain outdoors. This increase in outdoor entertainment around the grill has placed a higher usage load on each grill, creating the need for more frequent cleanings. Unfortunately, gas grill components are not easy to clean. The cooking surfaces and entire insides of the grill can become coated with burned on grease after a short interval. The grill parts, including the rotisserie system, should be kept simple, to a minimum of parts, and easy to clean.

Accordingly, a gas-fired cooker that does not have the limitations and shortcomings of the prior art would be highly desirable.

SUMMARY OF THE INVENTION

According to its major aspects and briefly stated, the present invention is generally a gas-fired cooker or grill with a rotisserie system designed to project heat horizontally towards the food being cooked along the entire length of a food holder. The gas-fired grill rotisserie includes a housing having an upper portion and a lower portion, the food holder such as a rotisserie system, and the horizontally extending gas burner. A radiant baffle assembly is mounted in the housing and includes a reflector shield, two spaced apart side brackets, and a front support. Preferably, the baffle is held to the grill by lances carried by the lower portion of the grill housing. The lances receive the lower edge of the reflector shield and are formed such that the reflector shield is retained frictionally. In this manner, the baffle assembly may be removed from the grill without tools. The baffle assembly works in concert with the horizontal burner to project heat towards the food that is placed on the rotisserie.

A feature of the present invention is the use of a reflector shield made of a single sheet of stamped metal stock or molded ceramic. The single-member reflector is easier and more cost-efficient to manufacture because the need for spot welds and fasteners is eliminated. Further, the single-member reflector eliminates complex assembly and therefore results in finer tolerances and better appearance in the finished product. Additionally, because there are no assembled parts or weld seams to trap grease and dirt, the reflector shield can be cleaned more easily and effectively. This feature is significant since clean metals, such as stainless steel, have a higher thermal reflectivity than dirty, oxidized metals. The higher thermal reflectivity will enable the reflector shield to redirect more radiant energy created at the burner towards the food. This feature represents a significant practical improvement over prior art designs such as the one disclosed by Berger in U.S. Pat. No. 5,129,312, which discloses a reflector shield that is assembled from various stampings spot-welded together and is impractical to clean.

Another feature of the present invention is the use of a radiant baffle in combination with a horizontal burner of a length that is substantially the same as the length of the food holder and grill housing. Through the use of a horizontal burner that is longer than burners in prior art, more thermal energy is available for cooking, which also results in shorter cooking times than in previous designs. The longer burner is counterintuitive since it requires more material than those designs used in prior art. The use of a longer burner and baffle also ensures that the food in the rotisserie is more evenly cooked, especially, for example, at the extremities of longer roasts and when grilling multiple chickens.

Still another feature of the present invention is the use of support lances, which are carried by the grill housing. The lances are metal clips that are either integrally formed in the housing or are formed on a separate piece that is fastened to the housing. The lances releasably retain the lower edges of the reflector shield to the grill housing so that the user may remove the baffle for cleaning without removing screws or other fasteners. By eliminating fasteners and reducing complexity, the lances also reduce assembly and manufacturing costs. Further, the use of the lances also allows for greater clearance of a burner igniter and for an independently mounted optional cooking rack. In addition, users can more easily clean a baffle assembly that is easily removed and reinstalled.

The arrangement of the burner in relation to the reflector shield is another feature of the invention. The reflector shield, together with the front support, creates a narrow opening that functions as a linear nozzle. The burner is positioned so that it sits just below this opening. The flammable gas enters the burner under pressure at a certain velocity. As the flammable gas departs the burner, its velocity increases slightly and it is ignited. The combustion increases the effective pressure because the gas expands effectively at constant volume. The narrow opening of the nozzle further increases the gas pressure. According to the Bernoulli Equation, the gas pressure and gas velocity are inversely proportional so that, as the exhaust gas passes through the nozzle and drops to atmospheric pressure, the velocity of the exhaust gas increases.

The form of the reflector shield is yet another feature of the invention. The reflector shield has corrugations that:

(1) create turbulence in the rising burner exhaust gases, which causes a higher rate of convective heat transfer between the exhaust gas and the reflector shield; and
(2) help to disperse radiant energy directed from the burner towards the food; and
(3) provide the needed rigidity to the reflector shield so that the shield will fit properly in the grill housing with good fit and finish.

Some of the convective heat transferred to the reflector shield is re-emitted as secondary radiant energy as the reflector shield heats up. The curvature of the reflector shield helps to concentrate any secondary radiant energy emitted by the reflector shield. As a result, the food on the rotisserie is then cooked more rapidly and efficiently.

These and other features and their advantages will be apparent to those skilled in the art of gas-fired cooker design and manufacturing from a careful reading of the Detailed Description of Preferred Embodiments, accompanied by the following drawings.

BRIEF DESCRIPTION OF THE DRAWINGS

In the drawings:

FIG. 4 shows a cross section of the reflector shield, according to a preferred embodiment.

FIG. 5 shows a cross section of the front support, according to a preferred embodiment.

FIG. 6 shows a cross section of the lance, according to a preferred embodiment.

DETAILED DESCRIPTION OF PREFERRED EMBODIMENTS

Figure 1:
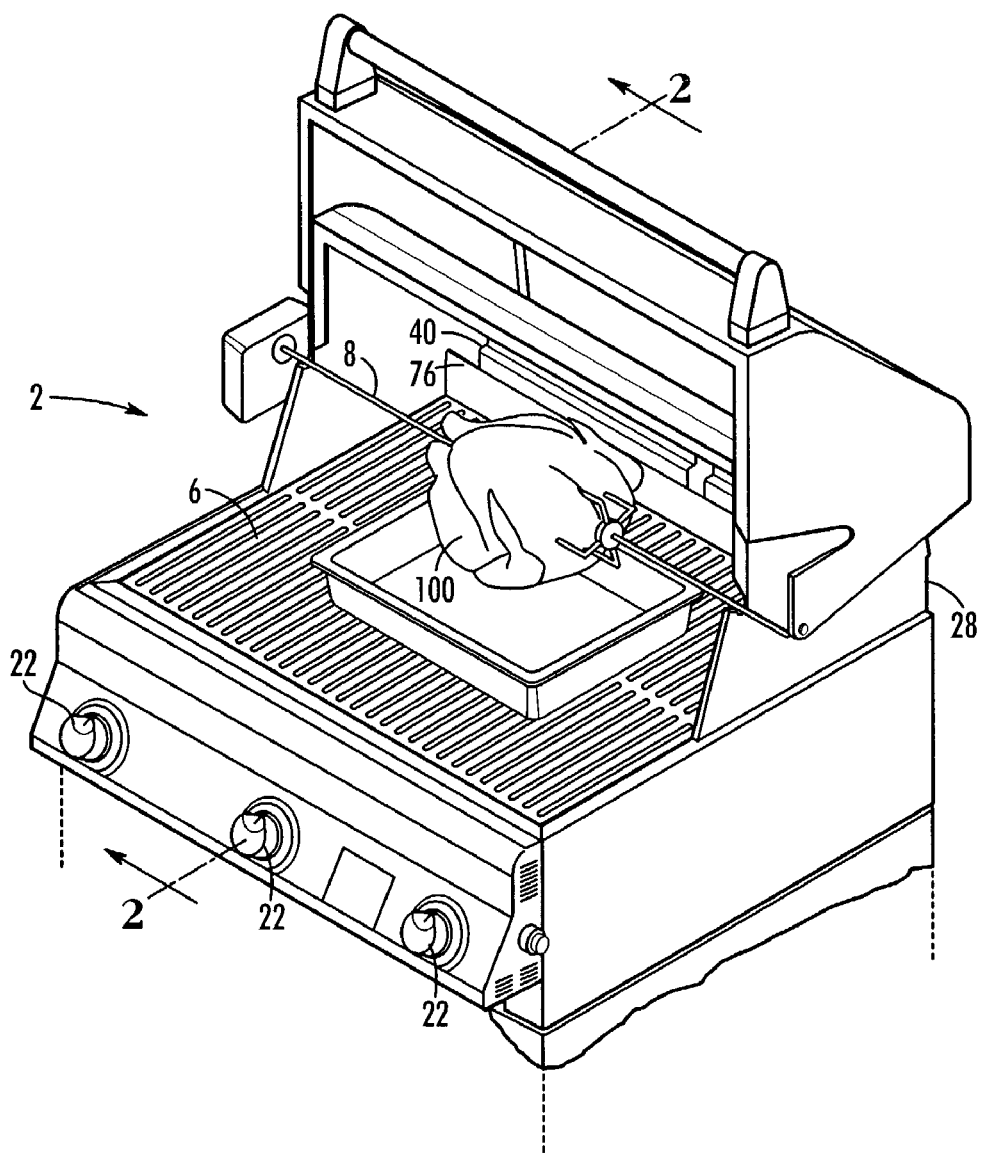
FIG. 1 is a perspective view of the grill housing and assembly without the cook surface or baffle assembly.

Referring now to the drawings, the preferred embodiment is a gas fired grill 2, as shown in FIG. 1, using an improved burner and baffle for a rotisserie system.

Figure 2:
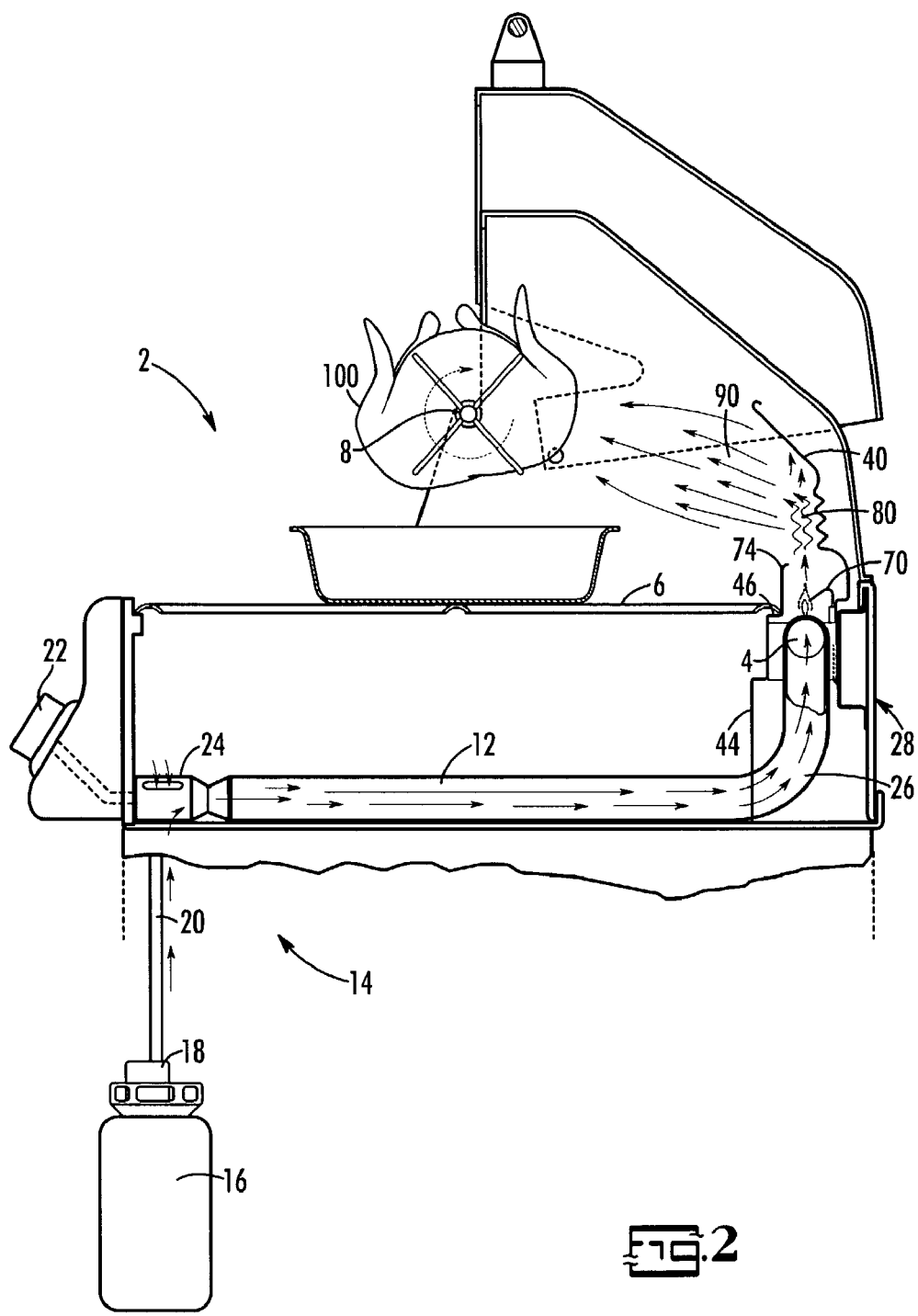
FIG. 2 is a detailed, partially schematic view of the gas delivery means, burner, and baffle assembly, according to a preferred embodiment of the present invention.

In FIG. 2, the grill 2 includes a horizontal burner 4 that is the same width as the rotisserie food holder 6 and the grid food holder 8. The burner 4 is supplied with a flammable gas 12 such as propane or methane that is routed to the burner 4 by a gas delivery means 14. The gas delivery means 14 includes a tank 16 and pressure regulator 18 that feeds a hose 20 running to a controlling means 22, such as a dial valve, which is then connected to an air mixer 24 and then to a rigid conduit 26 running through the grill housing 28.

In the preferred embodiment, the horizontal burner 4 is effectively a stainless steel tube formed in a "T" shape, but other burner shapes are possible to give the same effect. The top part of the T is perforated 30 to allow for even distribution of the gas once the user adjusts controlling means 22 to allow the gas to flow. The burner 4 is as wide as the food holder 8, which is also as wide as the baffle assembly 32 and the grill housing 28.

Figure 3A:
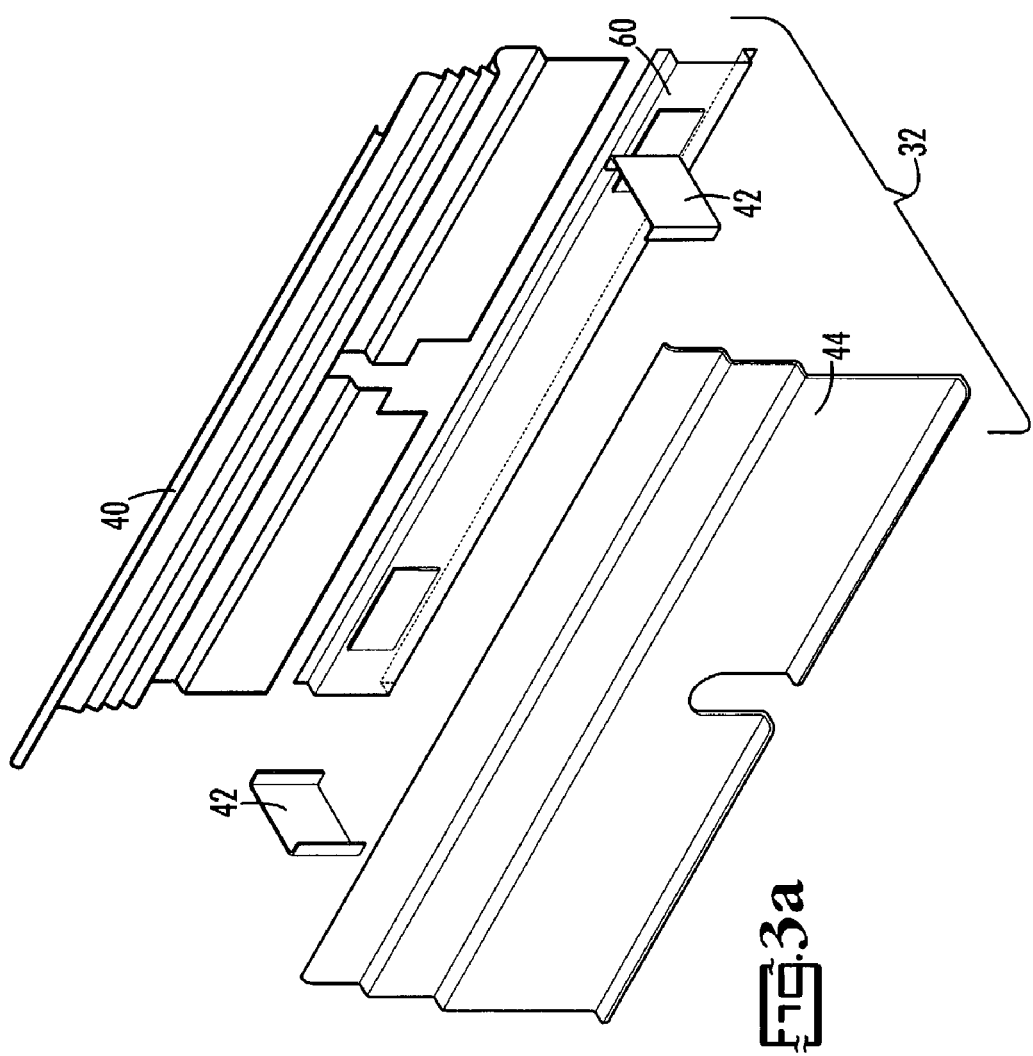
FIGS. 3 a, b, and c show an exploded, perspective view of the present baffle assembly, a partially cut away view of the assembled baffle assembly being installed on the lances, and the installed baffle assembly, respectively, according to a preferred embodiment of the present invention
Figure 3C:
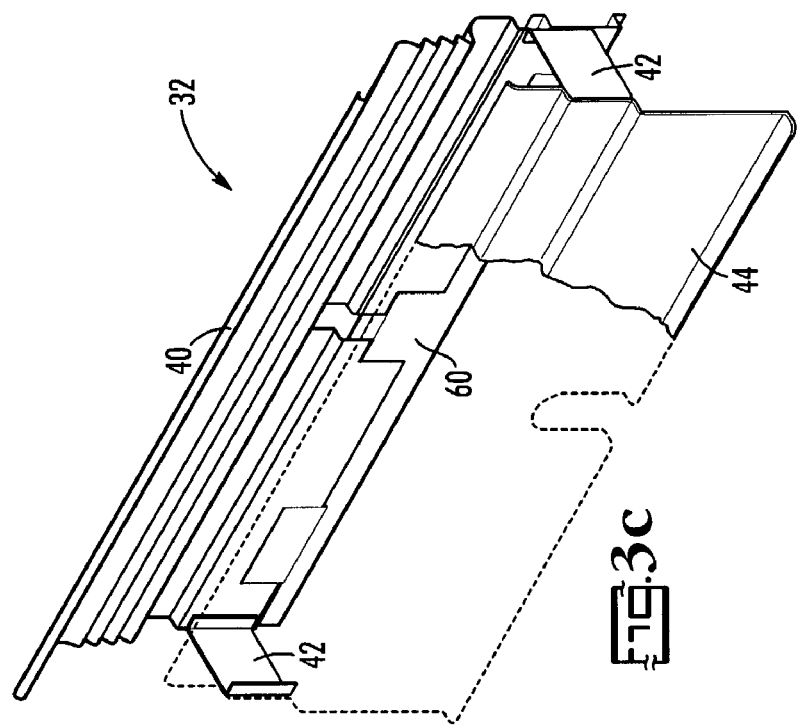
Figure 3B:
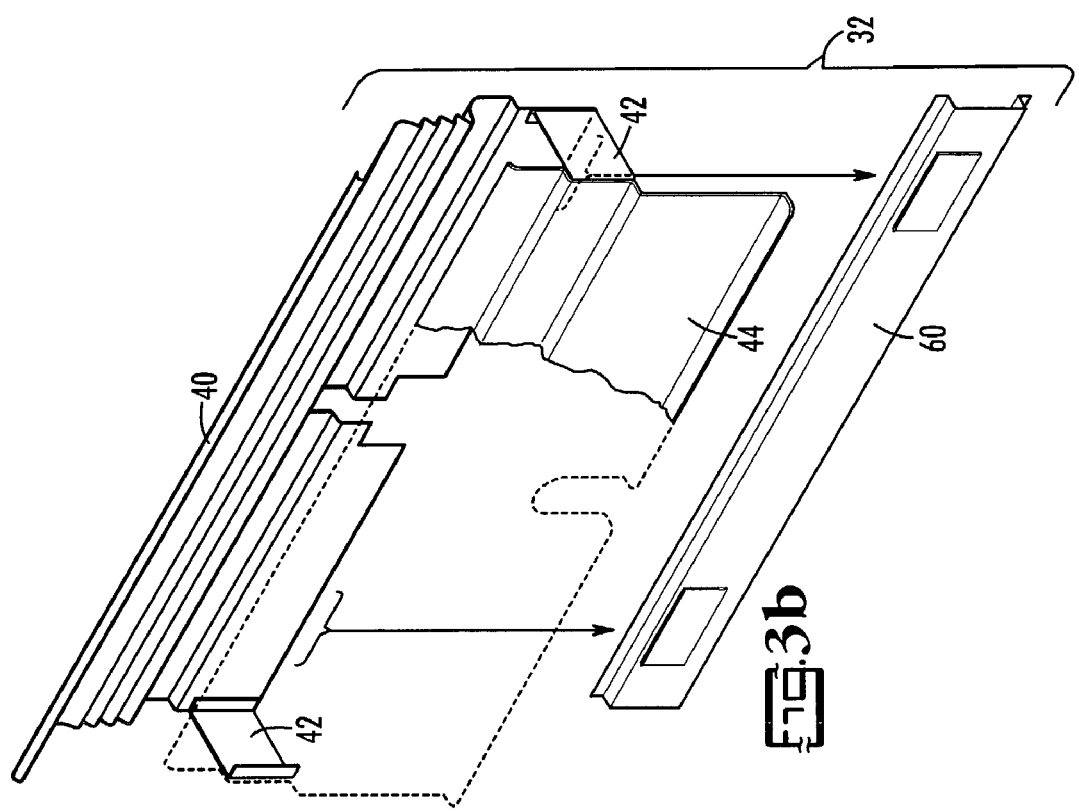

In FIGS. 3a, b, and c, the baffle assembly 32 is made up of a reflector shield 40, two side brackets 42 and a front support 44 that together form a channel for delivering hot exhaust gases from burner 4. In the preferred embodiment, the reflector shield 40 is made of stamped stainless steel sheet or roll stock formed to have multiple, substantially triangular corrugations 50 (shown on FIG. 4) running parallel to the food holder 8. The grill housing 28 has lances 60 (shown on FIG. 5) attached thereon to receive and support the reflector shield 40. The front support 44 (shown on FIG. 6) rests on the bottom of the housing 28 and helps support the food holder 8 at ledge 46.

In the preferred embodiment, as shown in FIG. 2, the grill 2 takes advantage of several heat transfer modes including convection, primary radiation, and secondary radiation. An igniter 70 that is either electrical or mechanical is located near the burner so that the user can ignite the gas once it begins to flow to the perforations. The burner 4 is positioned between the reflector shield 40 and the front support 44, thus creating a long, narrow opening or linear nozzle 74 just above where combustion occurs. The combustion creates a primary radiant heat source. The primary radiant heat is directed upwards towards the reflector shield 40. The curvature 76 of the reflector shield 40 toward the rotisserie directs the primary radiant heat towards the food 100. The corrugations 50 and brushed finish of the reflector shield serve to diffuse the reflected radiant heat, resulting in evenly cooked food 100.

The form of the reflector shield 40 also helps to augment the cooking by amplifying the effects of the remaining heat transfer modes: convection and secondary radiation. Since combustion of the flammable gas at the burner raises the gas pressure at constant volume, the velocity of the exhaust gases 90 increases as the gases pass through the nozzle 74 to reach atmospheric pressure. The curvature 76 of the reflector shield 40 toward the rotisserie may also cause some of the accelerated exhaust gas to heat the food 100 directly by convection. Cooking efficiency is thereby increased because faster moving air will conduct heat more rapidly to the food 100 than still air.

The corrugations 50 on the reflector shield also help to capture some of the heat from the exhaust gases 90. The moving exhaust gases 90 are directed upwards and strikes the corrugations 50 on the reflector shield 40. The heat transfer mechanism at work is convection: the exhaust gases 90 move swiftly past the reflector shield 40 transferring heat to the shield 40. The corrugations 50 create air turbulence 80 that increases the convective heat transfer rate. The heat transferred to the reflector shield 40 from the exhaust gases 90 causes the temperature of the reflector shield 40 to increase. The heated reflector shield 40 then emits secondary radiant heat towards the food 100. As with the primary radiant heat, the corrugations channel and distribute evenly the secondary emitted radiant heat towards the food 100.

Finally, those skilled at designing and producing gas grills will recognize that substitutions and modifications can be made in the foregoing preferred embodiments without departing from the spirit and scope of the present invention.

What is claimed is:

1. A gas grill comprising:
  a) a housing;
  b) gas delivery means for delivering a flammable gas into said housing;
  c) a control means in operational connection with said gas delivery means, said control means adapted to regulate the rate of flow of said flammable gas through said gas delivery means;
  d) a food holder carried by said housing, said holder having a width; and
  e) a baffle assembly mounted in said housing, said baffle assembly and said food holder being in spaced relation to said gas delivery means so that, when said flammable gas is delivered into said housing and to said baffle assembly by said control means, and said gas is burned to produce exhaust gases, said exhaust gases from said gas move from said gas delivery means through said baffle assembly and across said food holder, wherein said baffle assembly further comprises a front and an opposing reflector shield, said front being curved toward said reflector shield to define a linear nozzle over the location where said gas is burned, which linear nozzle further increases the velocity of said exhaust gases, said reflector shield being frictionally held by said housing so that said reflector can be lifted free of housing for cleaning.

2. The gas grill as recited in claim 1, wherein said baffle assembly has a width and said width of said baffle assembly is the same as the width of said food holder.

3. The gas grill as recited in claim 1, wherein said housing has at least one lance formed therein and said reflector shield has a lower edge, said reflector shield being frictionally supported solely by said lower edge on said at least one lance, so that said reflector shield can be lifted free of housing without tools.

4. The gas grill as recited in claim 1, wherein said reflector shield is made of molded ceramic.

5. The gas grill as recited in claim 1, wherein said reflector is made of a single sheet of stamped metal stock.

6. The gas grill as recited in claim 5, wherein said metal stock is stainless steel metal stock.

* * * * *